United States Patent
Wang

(10) Patent No.: US 6,291,386 B1
(45) Date of Patent: Sep. 18, 2001

(54) PROCESS FOR THE IN-SITU PREPARATION OF SINGLE-SITE TRANSITION METAL CATALYSTS AND POLYMERIZATION PROCESS

(75) Inventor: Shaotian Wang, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/318,009

(22) Filed: May 25, 1999

(51) Int. Cl.$^7$ .............................. B01J 31/00; B01J 37/00; C08F 4/02; C08F 4/60
(52) U.S. Cl. ........................ 502/124; 502/118; 502/128
(58) Field of Search ................................... 502/118, 124, 502/128

(56) References Cited

U.S. PATENT DOCUMENTS

| | | |
|---|---|---|
| 4,752,597 | 6/1988 | Turner . |
| 4,791,180 | 12/1988 | Turner . |
| 5,153,157 | 10/1992 | Hlatky et al. . |
| 5,198,401 | 3/1993 | Turner et al. . |
| 5,241,025 | 8/1993 | Hlatky et al. . |
| 5,510,434 * | 4/1996 | Takeuchi ........................... 502/118 |
| 5,519,100 | 5/1996 | Ewen et al. . |
| 5,539,124 * | 7/1996 | Etherton et al. .................... 502/118 |
| 5,576,259 | 11/1996 | Hasegawa et al. . |
| 5,612,271 | 3/1997 | Zandona . |
| 5,614,457 | 3/1997 | Ewen et al. . |
| 5,637,660 | 6/1997 | Nagy et al. . |
| 5,670,587 * | 9/1997 | Takeuchi et al. ................... 502/129 |
| 5,747,614 * | 5/1998 | Takeuchi et al. ................... 502/118 |
| 5,756,609 * | 5/1998 | Cohen ............................... 502/128 |
| 5,756,611 | 5/1998 | Etherton . |
| 5,786,433 * | 7/1998 | Tomotsu et al. .................... 502/124 |
| 5,817,590 | 10/1998 | Hasegawa et al. . |
| 5,817,725 | 10/1998 | Zandona . |
| 5,902,866 * | 5/1999 | Nagy et al. ........................ 502/117 |
| 6,114,270 * | 9/2000 | Krishnamurti et al. .............. 502/103 |
| 6,136,744 * | 10/2000 | Gillis et al. ....................... 502/128 |

FOREIGN PATENT DOCUMENTS

| | | |
|---|---|---|
| 0 500 944 A1 | 2/1992 | (EP) . |
| 0 570 982 B1 | 2/1997 | (EP) . |
| WO 95/10546 | 4/1995 | (WO) . |
| WO 98/41529 | 9/1998 | (WO) . |

OTHER PUBLICATIONS

Bergemann, Ch., et al.: "Application of a Cationic Activated Metallocene Catalyst System in the Copolymerization of Ethylene and 1–butene under High Pressure," *Journal of Molecular Catalysis A: Chem* 135, pp. 41–45 (1998). No month.

* cited by examiner

*Primary Examiner*—Elizabeth D. Wood
*Assistant Examiner*—J. Pasterczyk
(74) *Attorney, Agent, or Firm*—Gerald A. Baracka; Kevin M. Carroll

(57) ABSTRACT

The invention relates to a process for the in-situ preparation of alkylated single-site transition metal catalysts by contacting a precatalyst which comprises halogen, alkoxy or amido group, with an alkylating agent in the polymerization system. The precatalyst, which is produced prior to introducing into the polymerization system, is obtained by contacting a transition metal complex and boron-containing ionizing agent, optionally, with a support.

31 Claims, No Drawings

PROCESS FOR THE IN-SITU PREPARATION OF SINGLE-SITE TRANSITION METAL CATALYSTS AND POLYMERIZATION PROCESS

FIELD OF THE INVENTION

The invention relates to improved single-site transition metal catalysts useful for the polymerization of α-olefins wherein the active catalyst species is formed in-situ, i.e., in the polymerization reaction system. For preparation of the catalysts of this invention, a transition metal precatalyst is prepared by contacting a transition metal complex containing at least one labile ligand capable of being removed and replaced with an alkyl group, an ionizing agent and, optionally, a support material, and thereafter contacting the precatalyst with an organometallic alkylating agent in the polymerization reaction system. By producing the catalyst in this manner it is possible to eliminate instability problems heretofore observed with transition metal complexes which have alkyl substituents associated with the transition metal. Furthermore, with certain types of transition metal complexes, significant improvements in catalytic activity and/or improvements in resin properties can be achieved when the catalysts are produced in situ in the manner described herein.

BACKGROUND OF THE INVENTION

Metallocene catalyst systems comprised of a metallocene compound and aluminoxane cocatalyst are known and have good activity for the polymerization of α-olefins. While the resulting polymers and copolymers typically have acceptable molecular weight and molecular weight distribution and good morphology, aluminoxanes are relatively expensive and must be used at high levels relative to the transition metal. Ratios of 500 to 1000 moles Al per mole of transition metal are not uncommon. These high levels of cocatalyst increase manufacturing costs and can also result in unacceptable levels of aluminum residue in the resulting resin.

To overcome the problems associated with the use of aluminoxane cocatalyzed metallocene catalysts, catalyst systems have been developed based on cationic metallocene catalysts formed using cocatalysts capable of forming a stable anion. Ionic organoboron compounds are commonly used as cocatalysts in these systems. While the cationic metallocene catalysts eliminate the use of aluminoxanes, there still are certain disadvantages associated with their use. First and foremost is the need to use alkyl-substituted transition metal complexes to obtain an active cationic catalyst species and the recognized instability of such alkyl group-substituted transition metal complexes. Whereas transition metal complexes containing one or more halogen groups exhibit good shelf life, the corresponding alkyl-substituted transition metal complexes rapidly lose activity particularly in the presence of trace impurities.

Additionally, and presumably to some extent related to the instability of the alkyl-substituted transition metal complexes, preparative procedures employed to produce the cationic transition metal catalyst can be involved, often requiring critical mixing steps and specific reagents. In this regard, reference may be had to published European patent application 0500944A1 wherein a catalyst system is obtained by reacting a halogenated metallocene compound containing cyclopentadienyl or cyclopentadienyl derivative ligands with an organometallic compound and then bringing the resultant reaction product into contact with a compound which forms the active cationic catalyst. The reference discloses that the halogenated metallocene compound must first be reacted with the organometallic compound and the resultant product then brought into contact with the compound forming the active cationic catalyst. It goes on to state that if the order is wrong, the resulting catalyst systems do not polymerize α-olefins at all or activity of the catalyst system is very low and reproducibility of polymerization is poor. Furthermore, the type of organometallic compound used is critical since, in the examples, it is shown that trimethyl aluminum does not react with the halogenated metallocene compound.

U.S. Pat. No. 5,817,725 similarly discloses that it is critical to first combine the neutral metallocene and alkylating agent before contacting with the ionizing agent in order to produce effective cationic metallocene catalysts. In Example 3 of the patent, it is shown that when the neutral metallocene is first reacted with the ionizing agent and then subsequently brought into contact with the trialkylaluminum, little or no polymerization was obtained.

Bergemann, et al., in the *Journal of Molecular Catalysis A: Chemical* 135 (1998), 41–45, also describe a procedure wherein a metallocene is dissolved in toluene and contacted with triisobutylaluminum before contacting with the cationic activator compound.

Active metallocene catalysts comprising a metallocene compound, an ionizing ionic compound, an organoaluminum compound and a Lewis base compound are described in U.S. Pat. No. 5,576,259. While patentees state that the method of catalyst preparation is not limited, all of the exemplified catalysts are made by first contacting the alkylaluminum with the metallocene compound and then, after mixing for a period of time, contacting with the ionizing ionic compound and Lewis base. When the Lewis base was omitted, significantly reduced yields were reported.

Published International application WO95/10546 discloses the preparation of cationic metallocene catalysts using alkylation agents which are a mixture or reaction product of an alkyl aluminum compound and an alcohol. Without alcohol, there was little or no activity. While the reference indicates that the order of combining the catalyst components is generally not critical, it goes on to state that best results are obtained when the co-catalyst, i.e., ionizing compound, is introduced into the reactor only after the other components of the catalyst system. Moreover, all of the examples in the application react the aluminum-containing alkylating agent with the metallocene before contacting with the ionizing cocatalyst compound.

In U.S. Pat. Nos. 5,519,100 and 5,614,457 metallocene catalysts formed from a neutral alkylated metallocene compound and ionic ionizing compound are combined with a mixture of the -olefin and aluminum alkyl to effect polymerization. In this process the metallocene is pre-alkylated before contact with the olefin/aluminum alkyl mixture. In all of the above references, the polymerization-stable bulky anionic ligands (also referred to as ancillary ligands) associated with the transition metal are carbocyclic ligands, such as cyclopentadienyl (Cp) or substituted Cp, indenyl, fluorenyl, etc. There is no disclosure or suggestion that anything but metallocenes with Cp or Cp type ancillary ligands can be employed in the reference processes. Furthermore, those references which disclose supported cationic metallocenes either require that the alkylating agent and metallocene be reacted as the first step of the procedure or disclose in general terms that the order of mixing can be varied. None of the prior art references show that effective and, in some instances, markedly superior catalysts can be produced when a metallocene and ionizing agent are first combined, with or without a support, and then in a later step contacted in the polymerization reaction system with an alkylating agent to form the active catalyst in-situ.

The present invention wherein a transition coordination metal complex containing one or more labile ligands, such as halogen, and an ionizing agent are contacted in a first step and subsequently contacted with an alkylating agent in the polymerization reaction system overcomes problems associated with the heretofore reported procedures. The process of the invention also eliminates the need for Lewis bases and alcohols which are necessary for some of the prior art procedures. Also, by judicious selection of the transition metal complex and/or alkylation agents, it is possible to vary polymerization rates, comonomer incorporation and resin properties. Furthermore, when the transition metal complex is deposited on certain pretreated supports, in some instances the resulting catalysts prepared using the in-situ process of the invention unexpectedly exhibit activity greater than that of the corresponding unsupported catalyst. In another embodiment of the invention it has unexpectedly been found that when a supported precatalyst is formed using a neutral transition metal complex having one or more ancillary ligands which are anionic heterocyclic ligands, proportionally higher activity and the ability to vary resin properties over a wider range is observed compared to systems where only carbocyclic anionic ligands are associated with the transition metal.

SUMMARY OF THE INVENTION

The invention relates a process for the formation of single-site transition metal olefin polymerization catalysts in the polymerization system and to polymerizations conducted therewith. The formation of the active cationic transition metal catalyst in-situ involves contacting a precatalyst and organometallic alkylating agent in the polymerization system. The precatalyst, which is formed outside the polymerization system environment, is obtained by contacting a boron-containing ionizing agent and a neutral transition metal coordination complex. The precatalyst, which can be either supported or unsupported, contains at least one labile ligand capable of being removed and replaced with an alkyl group when contacted with an organometallic alkylating agent. Typically the molar ratio of boron to transition metal for the precatalyst will be from 0.1:1 to 10:1. The precatalyst is then introduced into the polymerization reaction system and contacted with an organometallic alkylating agent and the active cationic transition metal catalyst formed in-situ. Initiation of the in-situ catalyst formation may be done in the presence or absence of the olefin(s) to be polymerized. In one embodiment of the invention, contact of the precatalyst and alkylating agent is carried out in an inert hydrocarbon medium and under polymerization conditions. The molar ratio of alkylating agent metal to transition metal used generally ranges from 1:1 to 1000:1.

DETAILED DESCRIPTION OF THE INVENTION

The process of the invention comprises forming high activity single-site transition metal catalysts useful for the polymerization of α-olefins in the polymerization system. This is accomplished by first forming a precatalyst and thereafter contacting the precatalyst with an alkylating agent in the polymerization system to form the active alkylated cationic transition metal catalyst. Contact of the precatalyst and the alkylating agent in the polymerization system may be done in the presence or absence of the α-olefin(s) to be polymerized. The precatalyst may be either unsupported or supported and is obtained by combining a transition metal coordination complex and a boron-containing ionizing agent. By forming the alkylated cationic transition metal catalysts in-situ, polyolefin resins can be produced at high rates. Since the formation of the cationic transition metal catalyst occurs at some measurable rate, active catalyst continues to be produced as the polymerization proceeds which is believed to contribute to the ability of these catalysts to maintain activity for extended periods and produce resin at a more uniform rate.

The term "single-site" as used herein refers to catalysts capable of producing resins with relatively narrow molecular weight distributions (MWD). Single-site resins can be produced using both metallocene and non-metallocene catalyst systems. As used herein, the term "metallocene" is employed in the generic sense to encompass transition metal catalysts wherein the polymerization-stable ancillary ligands can be Cp or Cp derivative ligands, heterocyclic ligands or constrain-inducing ligands. Heterometallocenes will contain at least one polymerization-stable ancillary heterocyclic ligand.

Transition metal coordination complexes used to prepare the precatalysts employed for the process correspond to the general formula

$$(L)_n M(X)_m$$

where M is a Group 3–10 metal, L is a bulky ancillary anionic polymerization-stable carbocyclic, heterocyclic or constrain-inducing ligand, X is a labile ligand capable of being removed and replaced with an alkyl group when contacted with an alkylating agent, n is 1 to 4, m is 1 to 4 and n+m is equal to the valence of the metal. Preferably, the metal will be a Group 4, 5 or 6 transition metal and, it is especially useful when the metal is a Group 4 metal, particularly titanium, zirconium or hafnium. X can be hydrogen, halogen, $C_{1-20}$ alkoxy, $C_{6-20}$ aryloxy, or $C_{1-20}$ alkyl or $C_{6-20}$ aryl-substituted amino groups. Preferably, the labile ligand X is halogen and chlorine and bromine are especially preferred.

Carbocyclic ancillary ligands include substituted and unsubstituted Cp and Cp derivative ligands wherein the Cp ring is part of a fused ring structure, such as indenyl, 2-methylindenyl, tetrahydroindenyl, fluorenyl and the like. Polymerization-stable anionic ligands of this type are described in U.S. Pat. Nos. 4,791,180 and 4,752,597 which are incorporated herein by reference. Heterocyclic ancillary L groups include substituted or unsubstituted boraaryl, pyrrolyl, azaborolinyl, quinolinyl and pyridinyl groups such as described in U.S. Pat. Nos. 5,756,611 and 5,637,660, the teachings of which are incorporated herein by reference. The aforementioned heterocyclic ring systems may be part of a larger fused ring structure. Additionally, L can be a constrain-inducing ligand such as described in U.S. Pat. No. 5,272,536 which is incorporated herein by reference.

The polymerization-stable anionic ligands can be bridged. Bridging can be between the same or different ligand types. For example, a Cp ligand may be bridged to another Cp or to a heteroatomic ligand, such as a boraaryl moiety, through bivalent bridging group such as an alkylene, phenylene, silyl, phosphorus-containing groups, boron-containing groups and oxygen-containing groups. Exemplary groups within the above classes of bridging moieties are methylene, ethylene, phenylene, dialkylsilyl, diarylalkyl or their substituted versions and the like. By bridging it is possible to change the geometry around the transition metal and thereby modify catalyst activity, comonomer incorporation and polymer properties.

In one useful embodiment of the invention, the neutral transition metal coordination complex contains at least one anionic heterocyclic group and corresponds to the general formula:

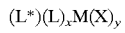

$(L^*)(L)_xM(X)_y$ wherein M, L and X are the same as defined above, L* is a bulky ancillary anionic polymerization-stable heterocyclic ligand, x is 1 to 3, y is 1 to 3 and x+y is equal to the valence of the metal minus 1. It is particularly advantageous when L* is selected from the group consisting of substituted and unsubstituted boraaryl, pyrrolyl, azaborolinyl, quinolinyl and pyridinyl ligands and X is chlorine or bromine.

The precatalysts are formed by contacting the transition metal complex with any of the known boron-containing ionizing compounds capable of converting the neutral complex to the cationic species. Such ionizing agents, sometimes also referred to as activators, are described in U.S. Pat. Nos. 5,153,157; 5,198,401 and 5,241,025, all of which are incorporated herein by reference, and include trialkyl and triaryl (substituted and unsubstituted) boranes, e.g., tripentafluorophenyl borane, and, more typically, ionic compounds, such as organoborates. Highly useful organoborate ionizing agents for the process are N,N-dimethylanilinium tetra (pentafluorophenyl)borate and triphenylcarbenium tetrakis (pentafluorophenyl)borate.

Contact of the neutral transition metal complex and ionizing agent is typically carried out by preparing separate hydrocarbon solutions of each component and then combining the two solutions, either in the presence or absence of a support material. Conventional inert hydrocarbon solvents, both aliphatic and aromatic, can be employed for the precatalyst preparation step. These include hydrocarbons such as isobutane, pentane, hexane, heptane, toluene and the like. Mixtures of hydrocarbons may also be employed. Furthermore, if the precatalyst is to be used in a solution or slurry polymerization, it is not necessary that the hydrocarbon(s) utilized for the preparation of the precatalyst be the same as used for the polymerization.

When the precatalyst is supported, hydrocarbon solutions of the transition metal complex and ionizing agent are combined with the support and, typically, after some contact period, the hydrocarbon removed under vacuum or by other known means. The supported precatalyst may be washed prior to use and, if desired, resuspended in fresh hydrocarbon. Supported precatalysts may be introduced to the polymerization system either in dry form or, as is more typically the case, in a hydrocarbon medium as a slurry or suspension. Supported precatalysts have been found to be particularly advantageous with transition metal complexes containing at least one heterocyclic ligand.

Precatalysts prepared in accordance with the above-described procedures exhibit good shelf-life stability. The precatalysts may be stored for extended periods in a dry box or the like without significantly decreasing the activity of in-situ catalysts produced therefrom. While this feature by itself provides a significant benefit for polyolefin producers, especially considering the stability problems reported with pre-formed cationic alkylated transition metal catalysts, there is an added advantage in that it is possible to form different alkylated catalyst species in-situ from a single precatalyst simply by varying the organometallic alkylating agent used for the polymerization. Thus, it is possible to produce polymers with different properties using the same precatalysts. Also, as a practical matter, resin producers need only store one precatalyst rather than several preformed alkylated catalysts differing from each other only by virtue of their different alkyl substituents.

For the formation of the precatalyst, the molar ratio of boron to transition metal will range from about 0.1:1 to 10:1 and, more preferably, from 1:1 to 3:1. Excellent results are observed using substantially equimolar amounts, based on the metals, of the transition metal complex and ionizing agent up to 1.5:1 molar ratio 1 (B:transition metal). Supported precatalysts can have from 0.001 to 0.5 mmole transition metal per gram of support. More commonly, the supported precatalysts and particularly the precatalysts obtained using the preferred inorganic oxide supports, will contain from 0.01 to 0.25 mmole transition metal per gram of support. To a large extent the amount of cationic transition metal complex deposited on the support is governed by the activity of the particular complex being used, the type of polymerization and polymerization conditions to be used.

Conventional inorganic and organic support materials can be used for the preparation of the precatalyst. These include inorganic oxides, inorganic silicates, inorganic chlorides and organic polymer resins and mixtures thereof The inorganic oxides most commonly include oxides of Groups 2, 3, 4, 5, 13 and 14 elements and inorganic chloride supports are primarily chlorides of Group 2 and 3 elements. Inorganic silicates include such materials as zeolites. Organic polymer supports can include styrenic polymers, such as polystyrene and styrene-divinylbenzene copolymers; polyolefins, such as polyethylene and ethylene-alkyl acrylate copolymers; polybenzimidizoles and the like. Inorganic supports are most commonly used and silica, alumina, silica-alumina, magnesia, titania and zirconia are preferred.

Useful inorganic oxide supports typically have surface areas in the range 10 to 700 m$^2$/g, pore volumes in the range 0.1 to 4 ml/g, average particle sizes from 10 up to 500 $\mu$m and pore diameters from about 10 to 1000 Å. More preferably, surface areas will range from 50 to 500 m$^2$/g, pore volumes from 0.5 to 3.5 ml/g, particle sizes from 20 to 200 $\mu$m and pore diameters from 20 to 500 Å. Silica and alumina supports within the above-prescribed ranges are most advantageously used for the preparation of precatalysts used for the present invention.

In one highly useful embodiment of the invention, the inorganic supports are pretreated prior to formation of the supported precatalyst to remove or reduce surface hydroxyl functionality. This can be accomplished by thermal or chemical treatment or, as is more commonly the case, a combination of such treatments. Silica supported single-site catalysts having one or more heterocyclic ligands particularly benefit by such pretreatment methods. When both thermal and chemical treatments are employed, the order may vary. Also, it is possible to utilize multiple chemical and/or thermal treatments.

The amount of surface hydroxyl groups removed will vary depending on the nature and extent of treatment; however, in one highly useful embodiment substantially all surface hydroxyl groups are removed. Hydroxyl functionality present on the surface of inorganic oxide supports, such as silica and alumina, can be measured using titrimetric procedures.

Thermal treatments can be carried out at temperatures of up to about 1000° C.; however, temperatures from 50° C. to 800° C. are most commonly used, particularly if the thermal treatment is to be used in conjunction with chemical treatment. Most thermal treatments will be carried out at temperatures from 100° C. to 600° C., particularly when preferred inorganic oxide supports are used.

If the support is subjected to chemical treatment, the treatment is carried out by contacting the support with an amount of a modifier capable of reacting with the surface hydroxyl groups. The amount of modifier can vary widely depending on the type of support and whether or not the support has undergone previous thermal treatment; however, it is generally added to the support in an amount preferably in the range of about 0.1 to 20 mmoles of metal (contained in the modifier) per gram of support. More preferably, the modifier is used in an amount from about 0.2 to 10 mmoles/gram and, most preferably, from about 0.5 to 5 mmoles/gram. Treatment with the modifier may be performed in either the liquid phase or in the vapor phase. In the liquid phase, the modifier is applied to the support as a liquid, either by itself or as a solution in a suitable hydrocarbon solvent such as a hexane. In the vapor phase, the modifier is contacted with the support in the form of a gas. Treatment temperatures are generally in the range of from about 20° C. to about 400° C. Both thermal and chemical treatments can be carried out in a batch, semi-continuous, or continuous manner.

Preferred modifiers are alumoxanes, alkyl aluminums, alkyl aluminum halides, alkyl aluminum hydrides, alkylsilyl halides, alkyldisilazanes, alkyl and aryl alkoxysilanes, and alkyl, aryl, and alkoxy boron compounds. Suitable compounds of the above types include: (poly)methylalumoxane (MAO), trimethylaluminum, triethylaluminum, tripropylaluminum, triisobutylaluminum, diethylaluminum chloride, diisobutylaluminum hydride, ethylaluminum dichloride, trimethylchlorosilane, dimethyldichlorosilane, hexamethyldisilazane, cyclohexylmethyldimethoxysilane, methyltrimethoxysilane, trimethylboron, triethylboron, tripropylboron, triisobutylboron, trimethoxyboron, triethoxyboron, triphenoxyboron and the like.

The precatalyst, either supported or unsupported, is introduced into the polymerization system where it is contacted with an organometallic alkylating agent to form the alkylated cationic transition metal catalyst in-situ. Suitable organometallic alkylating agents are compounds of Group 2 and 3 metals containing at least one alkyl group having from 1 to 8 carbon atoms and capable of reacting with the cationic transition metal complex of the precatalyst to remove the labile group X and replace it with an alkyl group. Suitable organometallic alkylating agents include dialkyl zincs, dialkyl magnesiums, alkyl magnesium halides, alkyl aluminum dihalides, dialkyl aluminum halides and trialkyl aluminums. Preferably, aluminum alkyls are employed which can include compounds such as trimethylaluminum, triethylaluminum, tripropylaluminum, triisopropylaluminum, tributylaluminum, triisobutylaluminum, tripentylaluminum, trihexylaluminum, triheptylaluminum, trioctylaluminum, diethylaluminum hydride, diisopropylaluminum hydride, diisopropylaluminum hydride, diethylaluminum chloride, dipropylaluminum chloride, diisopropylaluminum chloride, diisobutylaluminum chloride, diethylaluminum ethoxide, diisopropylaluminum isopropoxide, ethylaluminum sesquichloride, isopropylaluminum sesquichloride, isobutylaluminum sesquichloride, ethylaluminum dichloride, isopropylaluminum dichloride, isobutylaluminum dichloride and ethylaluminum diisopropoxide. Aluminum trialkyls are especially useful particularly if the alkyl groups contain from 1 to 10 carbon atoms.

The precatalyst and alkylating agent can be carried out in a batch, continuous or semi-continuous manner, either in the presence or absence of the olefin(s). In one embodiment, the precatalyst is added to the polymerizer which already contains all or a portion of the alkylating agent. Unsupported precatalysts will be charged as hydrocarbon solutions whereas supported precatalysts can be charged in dry form or combined with a hydrocarbon and the resulting slurry used. In another useful embodiment, the precatalyst and alkylating agent are contacted outside the polymerization reactor, such as a catalyst feed line or recycle or makeup line, and the precontacted stream then fed into the polymerization reactor. Precontacting in this manner, i.e., in the polymerization system but outside the polymerization vessel, will generally be carried out in a stream which does not contain any olefin.

The amount of organometallic alkylating agent and precatalyst used can vary over a wide range depending on the type and method of polymerization but generally will be such that the molar ratio of alkylating agent metal to transition metal ranges from about 1:1 to 500:1. More typically, the molar ratio of alkylating agent metal to transition metal is from 3:1 to 300:1 and it is even more common for it to range from 10:1 to 200:1. In general, larger amounts of alkylating agent are utilized when supported precatalysts are employed.

The in-situ catalyst formation process of the invention is advantageously used for the preparation of any of the commonly known polyolefin resins using a variety of polymerization procedures and monomers. These processes involve polymerizing $C_{2-12}$-olefins, and most preferably, $C_{2-8}$ α-olefins, in the liquid or gas phase at pressures from 15 psi to 45,000 psi and temperatures from 50° C. up to about 300° C. Suitable preferred monomers include ethylene, propylene, butene-1, hexene-1, octene-1 and mixtures thereof. The in-situ catalyst formation process may also be employed with systems involving multiple polymerization stages of the same or different types. These may be homopolymerizations or copolymerizations involving two or more monomers.

The following examples illustrate the practice of the invention and are representative of various embodiments described and claimed herein. They are not intended as a limitation on the scope of the invention and variations/modification will be apparent to those skilled in the art. The following abbreviations are used throughout the examples:

| | |
|---|---|
| APFPB | N,N-dimethylanilinium tetra(pentafluorophenyl)borate |
| TBA | trisobutyl aluminum |
| TEA | triethyl aluminum |
| TMA | trimethyl aluminum |
| TPFPB | triphenylcarbenium tetrakis(pentafluorophenyl)borate |

Molecular weights, both weight average (Mw) and number average (Mn), reported in the examples were obtained by gel permeation chromatography. Molecular weight distribution (MWD) is Mw/Mn. Polymer densities were determined according to ASTM D-1505. The melt index ($MI_2$) of the polymers was measured according to ASTM D-1238, Condition E, using a 2.16 kg weight. Catalyst productivity is defined as the number of grams of polymer produced per gram of transition metal in the reactor over a one hour period.

EXAMPLES 1–3

(a) Preparation of (1-methylboratabenzene)(cyclopentadienyl)zirconium dichloride:

Ten ml dimethyl ether solution of 0.22 gram (2.25 mmole) lithium 1-methyl-boratabenzene was added to a 30 ml dimethyl ether solution of 0.915 gram (2.25 mmole) of cyclopentadienylzirconium trichloride tetrahydrofuran complex at −78° C. The reaction mixture was warmed to ambient temperature and stirred for 2 hours during which time a precipitate formed. Ether was removed under vacuum at room temperature and the resulting residue washed with toluene. (1-methylboratabenzene)(cyclopentadienyl) zirconium dichloride (0.54 grams; 1.70 mmole) was obtained upon re-crystallization from toluene (75.4% yield).

(b) In-situ Formation of Catalyst and Polymerization:

The above-prepared Zr complex was used to form an active cationic Zr catalyst species in-situ for the polymerization of ethylene. Three different aluminum alkyls were employed for these polymerizations. The polymerizations were carried out by charging approximately 550 ml dry hexane to a stainless steel polymerization reactor fitted with a stirrer, two-arm injector and means for introducing ethylene. To one arm of the injector was added an aluminum alkyl solution (1.0 molar in hydrocarbon). The second arm was charged with a solution of a precatalyst obtained by mixing a toluene solution of TPFPB with a solution obtained by dissolving the Zr complex prepared in toluene. The amounts of aluminum alkyl and TPFPB and Zr complex used in the formation of the precatalyst were calculated to give a concentration of $10 \times 10^{-6}$ mole Zr in the reactor and mole ratio of Al:B:Zr of 20:1:1. The aluminum alkyl solution was injected into the polymerizer using approximately 200 ml dry hexane and the reactor heated to 80° C. with stirring while bringing the ethylene pressure up to about 150 psi. This was accomplished over a period of about 10 minutes after which time the solution of precatalyst was injected using about 50 ml dry hexane. The total volume of hexane hydrocarbon solvent in the reactor was approximately 800 ml. During the polymerization (20 minutes), the temperature was maintained at 80° C. and ethylene was added as necessary to maintain the pressure at 150 psi. Catalyst productivity and resin melt index ($MI_2$) properties were determined for the dry polymers after removal of solvent. Results are set forth in Table I and the aluminum alkyl used for each polymerization is identified.

Comparative Example 1

To demonstrate the instability of the dialkyl analog of (1-methylboratabenzene)(cyclopentadienyl)zirconium dichloride and the benefits of forming the catalyst in-situ, (1-methylboratabenzene)(cyclopentadienyl)dimethyl zirconium was prepared by adding $CH_3MgBr$ (0.8 ml of 3.0 M solution in dimethyl ether) to 25 ml dimethyl ether suspension of 0.24 gram (0.754 mmole) (1-methylboratabenzene) (cyclopentadienyl)zirconium dichloride complex at −78° C. The reaction mixture was allowed to warm to room temperature and stirred at that temperature for two hours. Then, MgBrCl salt was removed by filtration. The residue remaining after evaporation of the ether was dissolved in a small amount of pentane. After cooling at −30° C. overnight, the supernatant liquid was removed and the crystalline material dried under vacuum to give 0.136 gram of dimethyl complex.

The freshly prepared (1-methylboratabenzene) (cyclopentadienyl)dimethyl zirconium was immediately utilized to polymerize ethylene. The Zr concentration, Al:B:Zr mole ratio, type and amount aluminum alkyl and polymerization temperature, pressure and time were identical to that of Example 1. A small amount of TMA (0.2 mmole) was added to the reactor prior to charging the pre-alkylated transition metal complex. Catalyst productivity for the 20 minute polymerization run was 214 kg polymer/g Zr per hour. However, when the 1-methylboratabenzene) (cyclopentadienyl)dimethyl zirconium was stored in a glove-box under carefully controlled conditions so as to exclude moisture and other deleterious agents for only five days, catalyst productivity was reduced to only 52.0 kg polymer/g Zr per hour. On the other hand, with the in-situ procedure of the present invention and utilizing (1-methylboratabenzene)(cyclopentadienyl)zirconium dichloride which had been comparably stored for up to as long as two years, no significant decrease in catalyst activity was observed.

Furthermore, it was observed that ethylene uptake rapidly dropped off during polymerizations where (1-methylboratabenzene)(cyclopentadienyl)dimethyl zirconium was directly introduced into the polymerizer. With the in-situ procedure of the present invention, ethylene uptake was more uniform over the course of the polymerization making it easier to control the temperature and pressure within the reactor. This also suggests that active catalyst species produced using the in-situ process of the invention may continue to be generated after the initial contact of the precatalyst and alkylating agent in the reactor.

EXAMPLES 4–6

Following the procedures and conditions described for Examples 1–3, polymerizations were conducted using bis (cyclopentadienyl)zirconium dichloride to form catalyst species in-situ. Results obtained are set forth in Table I.

TABLE I

| EXAMPLE | Aluminum Alkyl | Productivity (kg/g.Zr/hr) | $MI_2$ |
| --- | --- | --- | --- |
| 1 | TMA | 159.8 | 1295 |
| 2 | TEA | 130.2 | 21.8 |
| 3 | TBA | 162.1 | 247 |
| 4 | TMA | 250.6 | 1.45 |
| 5 | TEA | 182.5 | 0.64 |
| 6 | TBA | 217.4 | 0.21 |

EXAMPLE 7

To further demonstrate the ability to form active cationic transition metal catalysts in-situ, a supported precatalyst was prepared using (1-methylboratabenzene) (cyclopentadienyl) zirconium dichloride prepared in accordance with procedure (a) of Examples 1–3.

(a) Preparation of Supported Precatalyst:

Six grams silica (MS3030 obtained from PQ Corporation) was dried under vacuum at room temperature for 2 hours and then suspended in 60 ml dry hexane. A TMA/heptane solution (3.5 ml of 1.44M) was added to this suspension at room temperature. The amount of TMA used was essentially stoichiometric based on hydroxyl group analysis of the silica after vacuum drying. After stirring at room temperature for 20 minutes, solvent was removed and the support dried under vacuum. 1.02 Grams of the dried, chemically treated silica was then combined with 25 ml toluene solution of 26 mg (0.0815 mmoles) of the (1-methylboratabenzene) (cyclopentadienyl)zirconium dichloride and 75.4 mg (0.0815 moles) TPFPB and stirred at room temperature for 30 minutes. Toluene was removed and the resulting supported precatalyst dried under vacuum for 4 hours.

(b) In Situ Formation of Catalyst and Polymerization:

A homopolymerization was conducted to prepare polyethylene. For the polymerization, an amount of supported precatalyst sufficient to achieve the desired Zr molar amount ($10 \times 10^{-6}$ mole) was introduced into one arm of a two-arm injector connected to a 1.7 liter stainless steel polymerization reactor equipped with a stirrer and containing approximately 550 ml dry hexane. A solution of TBA (0.4 mmole) was placed in the other arm of the two-arm injector. The TBA solution was injected into the polymerization reactor using 200 ml dry hexane and the mixture heated to 80° C. with agitation. During the heat up period, typically about 10 minutes, ethylene was added so that the total pressure within the polymerizer was 150 psi at 80° C. At this point, the supported precatalyst was injected using about 50 ml dry hexane and polymerization commenced. The Al:B:Zr mole ratio was 40:1:1 and the total amount of solvent in the reactor was approximately 800 ml. The temperature was maintained at 80° C. and ethylene added as necessary to maintain the pressure at 150 psi during the 20 minute polymerization run. At the conclusion of the polymerization period, the polyethylene resin was recovered by venting the solvent and removing the dry polymer powder from the polymerizer. Productivity was 109 kg resin/g Zr per hour. The resin had an $MI_2$ of 0.80.

(c) When the above polymerization was repeated substituting TMA for the TBA and extending the polymerization time to one hour, productivity was increased to 148 kg polymer/g Zr per hour and the polyethylene had a much smaller $MI_2$ (0.02). Mw for the resin was increased to $146.8 \times 10^3$.

(d) An even greater increase in productivity was obtained by using TEA, lowering the amount of Zr to $5 \times 10^{-6}$ mole and changing the Al:B:Zr mole ratio to 60:1:1. Even though the polymerization time was extended to two hours, productivity was 271 kg polymer/g Zr per hour and acceptable polymer ($MI_2=0.49$) was produced.

EXAMPLE 8

Ethylene and butene-1 were copolymerized utilizing the precatalyst and conditions of Example 7(a) and (b) except that the aluminum alkyl was TMA and Al:B:Zr mole ratio was 60:1:1. Also, for this polymerization, 20 ml butene-1 comonomer was added to the reactor before introduction of TBA and in situ formation of the cationic catalyst species. Productivity was 76.7 kg copolymer/g Zr per hour and the copolymer $MI_2$ was 9.7.

Substituting TEA for TMA increased productivity to 221 kg copolymer/g Zr per hour and produced a resin having a density of 0.951, $MI_2$ of 99 and MWD of 2.7. When the amount of butene-1 comonomer was increased to 40 ml, productivity was lowered to 118 kg copolymer/g Zr per hour and copolymer density was 0.943.

EXAMPLES 9–12

Following the general procedure of Example 7(a), a supported precatalyst was 51 mg (0.064 mmole) APFPB, 20 mg (0.063 mmole) (1-methylboratabenzene)(cyclopentadienyl)zirconium dichloride, 10 ml toluene and 0.665 g silica (Davison 948). Prior to contact with the transition metal compound and APFPB, the silica was heated at 275° C. for about 16 hours under a dry nitrogen flow before chemically treating with TEA. The precatalyst was recovered by removing the solvent under vacuum at room temperature for 4 hours. The supported precatalyst was utilized and copolymerization of ethylene in accordance with the previously describes in-situ procedures except that a 1-liter reactor was used with isobutane (400 ml) as the solvent and pressure of 400 psi. Polymerization temperatures were 75° C. The Zr concentration was $10 \times 10^{-6}$ mole and Al:B:Zr mole ratio 133:1:1. Densities of the copolymers produced in these runs ranged from 0.944 to 0.952 g/cc.

Polymerization details and polymer properties are shown in Table II.

TABLE II

| Example | Aluminum Alkyl | Comonomer/ Amount (cc) | Time (minutes) | Productivity Kg/g.Zr/hr | $MI_2$ |
|---|---|---|---|---|---|
| 9 | TEA | — | 60 | 112 | 0.27 |
| 10 | TEA | butene-1/20 | 60 | 100 | 31 |
| 11 | TEA | hexene-1/20 | 60 | 93.9 | 22 |
| 12 | TMA | hexene-1/20 | 30 | 217 | 5.9 |

EXAMPLE 13

Bis(indenyl)zirconium dichloride (0.041 mole) and 0.041 mmole TPFPB were mixed with 11 ml toluene and 0.5 g silica. Prior to contacting, the silica was pretreated following the procedure used in Examples 9–12. After stirring 10 minutes, the supported precatalyst was recovered by vacuum drying for 4 hours. The supported precatalyst was used to polymerize ethylene following the procedure of Example 7 except that the temperature was increased to 80° C. The homopolymer resin had an $MI_2$ of 0.03, Mw of $197 \times 10^3$ and MWD of 3.3. Productivity was 72.7 kg polymer/g Zr per hour.

EXAMPLES 14 AND 15

To demonstrate the versatility of the in-situ process of the invention and the ability to polymerize propylene, precatalysts were prepared utilizing a transition metal complex wherein the bulky carbocyclic ligands were bridged. For these examples rac-dimethylsilylbis(indenyl) zirconium dichloride obtained from Boulder Scientific Company was used. In one case (Example 14) the precatalyst was unsupported and in the other (Example 15) it was supported on silica. The unsupported precatalyst was obtained in the usual manner by combining 0.01 mmole rac-dimethylsilylbis (indenyl) zirconium dichloride with 0.01 mmole TPFPB in 2 ml toluene. For preparation of the supported precatalyst, 1.203 g dried and chemically treated (following the procedure of Examples 9–12) silica was included with the Zr complex and ionizing agent. For these polymerizations 500 ml dry hexane and 500 ml liquid propylene were charged to a 1.7 liter reactor after which the alkylating TEA was injected followed by addition of the precatalyst. The polymerizations were carried out at 60° C. Zirconium concentration was $10 \times 10^{-6}$ and the Al:B:Zr mole ratio was 30:1:1. Productivity obtained using the unsupported precatalyst for the in-situ catalyst formation was 484 kg/g Zr per hour and the resulting polypropylene resin had a melting point of 129° C. (as measured by differential scanning calorimetry during second heating). Productivity was 79 kg/g Zr per hour using the supported precatalyst. The DSC melting point of the polypropylene resin produced using the supported catalyst was 134° C.

EXAMPLES 16 AND 17

The ability to vary the transition metal and ancillary ligands is exemplified in the following experiments. For the first experiment, bis(1-methylboratabenzene)hafnium dichloride was prepared by reacting 15 ml of a dimethyl ether solution containing 3 mmole 1-methylboratabenzene to 20 ml of a dimethyl ether solution of hafnium tetrachloride at −78° C. 8-(Quinolin)oxytitanium trichloride prepared following the procedure described in U.S. Pat. No. 5,637,600 was used in the second experiment. Both transition metal compounds were used for the homogeneous polymerization of ethylene utilizing the in-situ procedure and in accordance with the procedure of Example 1. The aluminum alkyl and boron-containing ionizing agent were TEA and TPFPB, respectively. The mole ratio Al:B:Hf used was 20:1:1 for the first polymerization and 40:1.6:1 (Al:B:Ti) was used for the second. While productivity was less than observed with the zirconium complexes, polyethylene homopolymer resins produced using the Hf and Ti complexes had weight average molecular weight of $74.1 \times 10^3$ and $78.4 \times 10^3$ and MWDs of 5.0 and 5.1, respectively.

EXAMPLES 18, 19, 20 AND 21

As illustrated in the previous examples, the in-situ procedure of the present invention can advantageously be employed for both homogeneous and heterogeneous polymerizations. However, in one especially useful embodiment of the invention where supported catalysts are employed for the slurry or particle form polymerization of ethylene it has unexpectedly been found that proportionally greater improvement in productivity over homogeneous polymerization results can be obtained with transition metal complexes having at least one heterocyclic ancillary ligand. Whereas those skilled in the art recognize that significantly different results are possible in ethylene polymerizations when a catalyst is supported such as increased productivity and the ability to produce higher molecular weight resins, there is a significantly greater enhancement of these benefits utilizing the present in-situ process with transition metal complexes containing at least one heterocyclic ancillary ligand.

To demonstrate this improvement, homogeneous ethylene homopolymerizations were carried out under identical conditions utilizing identically prepared precatalysts formed using bis(cyclopentadienyl)zirconium dichloride (Ex. 18) and (1-methylboratabenzene)(cyclopentadienyl)zirconium dichloride (Ex. 19). The boron-containing ionizing agent was TPFPB. Polymerizations were carried out using the homogeneous in-situ procedure at 80° C., 150 psi, TEA as the alkylating agent and a mole ratio of Al:B:Zr of 20:1:1. The amount of Zr in there actor was $10 \times 10^{-6}$ mole.

The same transition metal complexes and ionizing agent were then supported on pre-treated silica and the resulting supported precatalysts used for the heterogeneous homopolymerization of ethylene. The precatalysts were identically prepared and polymerization conditions were identical— 150 psi, 65° C., TEA as the alkylating agent and Al:B:Zr mole ratio of 133:1:1. Example 20 utilized the precatalyst made using bis (cyclopentadienyl)zirconium dichloride and Example 21 used the precatalyst obtained using (1-methylboratabenzene)(cyclopentadienyl)zirconium dichloride. The amount of Zr used for both heterogeneous polymerizations was $3 \times 10^{-6}$ mole.

Productivity, $M_w$ and MWD for each of the four polymerizations were as follows:

| (1-methylboratabenzene)(cyclopentadienyl zirconium complex | Productivity (kg polymer/g Zr per hr) | $M_w(\times 10^3)$ | MWD |
|---|---|---|---|
| Ex 18 homogeneous pzn | 130.2 | 51.0 | 3.8 |
| Ex 20 heterogeneous pzn | 288 | 171 | 3.1 |
| Bis(cyclopentadienyl) | | | |
| zirconium complex | | | |
| Ex 19 homogeneous pzn | 182.5 | 101.5 | 2.9 |
| Ex 21 hetereogeneous pzn | 219 | 178 | 2.6 |

The improvement obtained with precatalysts formed using transition metal complexes having at least one ancillary heterocyclic ligand is apparent from the above data. Whereas all of the experiments produced polyethylene, there was a 121% increase in productivity over the homogeneous system using the precatalyst containing the zirconium complex with the heterocyclic ligand (Ex 20 vs Ex 18) compared to only a 20% increase in productivity over the homogeneous polymerization using the precatalyst formed using zirconium complex without a heterocyclic ligand (Ex 19 vs Ex 21). The ability to increase catalyst productivity using supported catalysts containing heterocyclic ligands is unexpected and the magnitude of the increase obtained with the transition metal complex containing the 1-methylboratabenzene ligand is even more surprising. Additionally, a much greater increase in resin molecular weight (235% vs 75%) and narrowing of MWD is observed using the precatalyst produced with the zirconium complex containing the 1-methylboratabenzene ligand.

EXAMPLE 22

A pretreated silica support having substantially all surface hydroxyl functionality removed was obtained by adding 2.58 g neat triethylboron (95% purity from Aldrich; 25 mmoles) to a 35 ml heptane suspension of 10.02 g of the silica (Davison 948) which was previously chemically treated with hexamethyldisilazane followed by calcination at 150° C. After reflux at about 100° C. for 6 hours, solvent was removed and the solid was dried by vacuum for 3 hours. A portion of the pre-treated silica (2.32 g) was then combined with 87 mg bis(1-methylboratabenzene)zirconium dichloride (0.253 mmole) and 327 mg TPFPB (0.354 mmole) in 12 ml toluene. After stirring the suspension for 30 minutes at room temperature, toluene was removed by vacuum and the supported precatalyst dried for 3.5 hours.

The dried precatalyst was used to produce an ethylene/butene-1 copolymer following the general procedure of Example 7(b) in a 1-liter reactor at 400 psi in isobutane (400 ml total volume). The aluminum alkyl was TBA, zirconium amount $5 \times 10^{-6}$ mole and Al:B:Zr mole ratio 200:1.4:1. Butene-1 (120 ml) and hydrogen (about 13 mmole) were also added to the reactor for the polymerization which was carried out at 80° C. for 30 minutes. One hundred and eighteen grams copolymer having a density of 0.911 g/cc, $M_w$ of $212 \times 10^3$ and MWD of 2.7 were produced.

EXAMPLES 23–25

Eight ml of a toluene solution containing 42 mg (1-methylboratabenzene)(cyclopentadrenyl)zirconium dichloride (0.131 mmole) and 169 mg TPFPB (0.183 mmole) was combined with 1.20 g pre-treated silica support of Example 22. After stirring the mixture for about 1 hour at room temperature, toluene was removed by vacuum and the supported precatalyst dried for 5 hours. Three ethylene polymerizations were conducted using the dried precatalyst with three different alkylating agents following the general procedure of Example 7(b), i.e., using a 1-liter reactor at 400 psi in isobutane (400 ml total volume). The zirconium amount ($1.2 \times 10^{-6}$ mole) and Al:B:Zr mole ratio (300:1.4:1)

were the same for each of the three polymerizations. No hydrogen was added for these polymerizations. Results obtained for the polymerizations were as follows:

| Example | AlR$_3$ | Activity (kg/g Zr/hr) | Mw (x10$^3$) | MWD |
|---|---|---|---|---|
| 23 | TBA | 3080 | 201.3 | 3.1 |
| 24 | TEA | 1346 | 153.5 | 2.9 |
| 25 | TMA | 1194 | 157.9 | 3.6 |

The above data illustrate the ability to vary productivity and the properties of the resulting resins using the same supported precatalyst by varying only the alkylating agent used. This ability to use the same precatalyst to target different products using the in-situ catalyst formation process of the invention is highly desirable for resin producers.

I claim:

1. A process for the in-situ preparation of a single-site transition metal olefin polymerization catalyst which comprises:
   (a) forming a precatalyst by contacting a boron-containing ionizing agent with a neutral transition metal complex having the formula:

$(L)_nM(X)_m$ wherein M is a Group 3–10 metal, L is a bulky ancillary anionic polymerization-stable carbocyclic, heterocyclic or constraint inducing ligand, X is selected from the group consisting of halogen, C$_{1-20}$ alkoxy, C$_{6-20}$ aryloxy or alkyl- or aryl-substituted amido, n is 1 to 4, m is 1 to 4 and n+m is equal to the valence of the metal; and
   (b) introducing the precatalyst into a polymerization system and forming an alkylated cationic transition metal catalyst by contacting said precatalyst with an organometallic alkylating agent.

2. The process of claim 1 wherein the molar ratio of boron to transition metal in step (a) is from 0.1:1 to 10:1 and the molar ratio of alkylating agent metal to transition metal in step (b) is from 1:1 to 1000:1.

3. The process of claim 1 wherein M is a Group 4–6 transition metal.

4. The process of claim 3 wherein the neutral transition metal complex has the formula $(L^*)(L)_xM(X)_y$ where M, L and X are the same as defined above, L* is a bulky ancillary anionic polymerization-stable heterocyclic ligand selected from the group consisting of boraaryl, pyrrolyl, azaboralinyl, quinolinyl and pyridinyl, x is 1 to 3, y is 1 to 3, x+y is equal to the valence of the metal minus 1 and X is halogen.

5. The process of claim 2 wherein the boron-containing ionizing agent and neutral transition metal complex are contacted in an inert hydrocarbon medium.

6. The process of claim 1 wherein the boron-containing ionizing agent is a trialkyl borane, triaryl borane or ionic organoborate compound.

7. The process of claim 6 wherein the boron-containing ionizing agent is trispentafluorophenyl borane.

8. The process of claim 6 wherein the organometallic alkylating agent is a Group 2, 12 or 13 metal compound containing at least 1 alkyl group having from 1 to 8 carbon atoms.

9. The process of claim 6 wherein the boron-containing ionizing agent is an organoborate compound selected from the group consisting of N,N-dimethylanilinium tetra(pentafluorophenyl)borate and triphenylcarbenium tetrakis(pentafluorophenyl)borate.

10. The process of claim 8 wherein the organometallic alkylating agent is selected from the group consisting of dialkyl zincs, dialkyl magnesiums, alkyl magnesium halides, alkyl aluminum dihalides, dialkyl aluminum halides and trialkyl aluminums.

11. The process of claim 8 wherein the organometallic alkylating agent is an aluminium trialkyl wherein the alkyl groups contain from 1 to 4 carbon atoms.

12. A process for the in-situ preparation of a supported single-site transition metal olefin polymerization catalyst which comprises:
    (a) combining (1) a neutral transition metal complex having the formula:

$(L)_nM(X)_m$ wherein M is a Group 3–10 metal, L is a bulky ancillary anionic polymerization-stable carbocyclic, heterocyclic or constraint inducing ligand, X is selected from the group consisting of halogen, C$_{1-20}$ alkoxy, C$_{6-20}$ aryloxy or alkyl- or aryl-substituted amido, n is 1 to 4, m is 1 to 4 and n+m is equal to the valence of the metal; (2) a boron-containing ionizing agent; and (3) a support material; and (4) an inert hydrocarbon;
    (b) removing all or a portion of the inert hydrocarbon to obtain a supported transition metal precatalyst; and
    (c) introducing the supported transition metal precatalyst into a polymerization system and contacting said precatalyst with an organometallic alkylating agent to form a supported cationic transition metal catalyst.

13. The process of claim 12 wherein the molar ratio of boron to transition metal in step (a) is from 0.1:1 to 10:1 and the molar ratio of alkylating agent metal to transition metal in step (c) is from 1:1 to 1000:1.

14. The process of claim 12 wherein the support material is an inorganic oxide, inorganic silicate, inorganic chloride or organic polymer resin.

15. The process of claim 14 wherein the support material is an inorganic oxide selected from the group consisting of silica, alumina, silica-alumina, magnesia, titania and zirconia.

16. The process of claim 15 wherein the inorganic oxide support has a surface area from 10 to 700 m$^2$/g, pore volume from 0.1 to 4 ml/g, average particle size from 10 to 500 $\mu$m and pore diameter from 10 to 1000 Å.

17. The process of claim 16 wherein the support is silica.

18. The process of claim 15 wherein the precatalyst contains from 0.001 to 0.5 mmole transition metal per gram of support.

19. The process of claim 15 wherein the inorganic oxide support is pretreated to remove all or a portion of hydroxyl functionality present on the surface of the support.

20. The process of claim 19 wherein the pretreatment is accomplished by thermal, chemical or a combination of thermal and chemical means.

21. The process of claim 20 wherein thermal treatment is carried out by heating at 150° C. to 800° C.

22. The process of claim 20 wherein chemical treatment is carried out by contacting with a modifier selected from the group consisting of alumoxanes, alkyl aluminums, alkyl aluminum halides, alkylaluminum hydrides, alkylsilyl halides, alkyldisilazanes, alkyl and aryl alkoxysilanes, and alkyl, aryl, and alkoxy boron compounds.

23. The process of claim 19 wherein substantially all surface hydroxyl functional groups are removed.

24. The process of claim 12 wherein the boron-containing ionizing agent is a trialkyl borane, triaryl borane or ionic organoborate compound.

25. The process of claim 12 wherein M is a Group 4–6 transition metal.

26. The process of claim 25 wherein the neutral transition metal complex has the formula

where M, L and X are the same as defined above, L* is a bulky ancillary anionic polymerization-stable heterocyclic ligand selected from the group consisting of boraaryl, pyrrolyl, azaboralinyl, quinolinyl and pyridinyl, x is 1 to 3, y is 1 to 3, x+y is equal to the valence of the metal minus 1 and X is halogen.

27. The process of claim 24 wherein the boron-containing ionizing agent is an organoborate compound selected from the group consisting of N,N-dimethylanilinium tetra(pentafluorophenyl)borate and triphenylcarbenium tetrakis(pentafluorophenyl)borate.

28. The process of claim 24 wherein the boron-containing ionizing agent is trispentafluorophenyl borane.

29. The process of claim 24 wherein the organometallic alkylating agent is a Group 2, 12 or 3 metal compound containing at least 1 alkyl group having from 1 to 8 carbon atoms.

30. The process of claim 29 wherein the organometallic alkylating agent is selected from the group consisting of dialkyl zincs, dialkyl magnesiums, alkyl magnesium halides, alkyl aluminum dihalides, dialkyl aluminum halides and trialkyl aluminums.

31. The process of claim 30 wherein the organometallic alkylating agent is an aluminium trialkyl wherein the alkyl groups contain from 1 to 4 carbon atoms.

* * * * *